(12) United States Patent
Matsushima et al.

(10) Patent No.: US 10,908,464 B2
(45) Date of Patent: Feb. 2, 2021

(54) LIQUID CRYSTAL DISPLAY DEVICE WITH PIXEL ELECTRODES OVERLAPPING A SLIT BETWEEN COMMON ELECTRODES

(71) Applicant: Japan Display Inc., Minato-ku (JP)

(72) Inventors: Toshiharu Matsushima, Tokyo (JP); Tatsuya Yata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/375,352

(22) Filed: Apr. 4, 2019

(65) Prior Publication Data

US 2019/0331968 A1 Oct. 31, 2019

(30) Foreign Application Priority Data

Apr. 25, 2018 (JP) ................... 2018-084002

(51) Int. Cl.
*G02F 1/1337* (2006.01)
*G02F 1/1343* (2006.01)
(Continued)

(52) U.S. Cl.
CPC ...... *G02F 1/134309* (2013.01); *G02F 1/1337* (2013.01); *G02F 1/133512* (2013.01); *G02F 1/136286* (2013.01); *G09G 3/3614* (2013.01); *G09G 3/3688* (2013.01); *G02F 2201/121* (2013.01); *G02F 2201/123* (2013.01); *G09G 2300/0426* (2013.01); *G09G 2300/0478* (2013.01)

(58) Field of Classification Search
CPC ............ G02F 1/133512; G02F 1/1337; G02F 1/134309; G02F 1/136286; G02F 2201/121; G02F 2201/123; G09G 2300/0426; G09G 2300/0478; G09G 3/3614; G09G 3/3688
See application file for complete search history.

(56) References Cited

U.S. PATENT DOCUMENTS 7,570,241 B2 * 8/2009 Kim .................... G09G 3/3655
345/93
9,298,051 B2   3/2016 Matsushima
(Continued)

FOREIGN PATENT DOCUMENTS

JP        2015-114493        6/2015

OTHER PUBLICATIONS

Combined Chinese Office Action and Search Report dated Apr. 2, 2020 in Patent Application No. 201710099142.1 (submitting unedited computer generated English translation only), 8 pages.

*Primary Examiner* — Ram A Mistry
(74) *Attorney, Agent, or Firm* — Oblon, McClelland, Maier & Neustadt, L.L.P.

(57) ABSTRACT

According to one embodiment, a liquid crystal display device includes scanning and video signal lines, pixel electrodes and first and second common electrodes. The pixel electrodes include first and second pixel electrodes with linear electrodes and connection portion. In the first pixel electrodes, the linear electrodes overlap the first common electrode, and the connection portion overlaps first slit between the first and second common electrodes. In the second pixel electrodes, the linear electrodes overlap the second common electrode, and the connection portion overlaps second slit between the second and first common electrodes. Different potentials are applied to the first and second common electrodes.

16 Claims, 14 Drawing Sheets

(51) Int. Cl.
    *G02F 1/1362*     (2006.01)
    *G02F 1/1335*     (2006.01)
    *G09G 3/36*     (2006.01)

(56) References Cited

U.S. PATENT DOCUMENTS

| | | |
|---|---|---|
| 2008/0299690 A1 | 12/2008 | Hirota |
| 2011/0156992 A1 | 6/2011 | Moon et al. |
| 2012/0188476 A1 | 7/2012 | Hirakata et al. |
| 2013/0100388 A1 | 4/2013 | Matsushima |
| 2013/0328795 A1* | 12/2013 | Yao ................... G09G 3/3655 345/173 |
| 2014/0009711 A1 | 1/2014 | Tomioka et al. |
| 2014/0092353 A1 | 4/2014 | Matsushima |
| 2014/0118639 A1 | 5/2014 | Matsushima |
| 2015/0160520 A1 | 6/2015 | Matsushima |
| 2015/0323841 A1 | 11/2015 | Matsushima |
| 2015/0323842 A1* | 11/2015 | Matsushima ..... G02F 1/134363 349/110 |
| 2016/0026043 A1 | 1/2016 | Okazaki et al. |
| 2016/0282685 A1 | 9/2016 | Kim et al. |
| 2017/0045787 A1 | 2/2017 | Kita et al. |
| 2017/0212390 A1 | 7/2017 | Miyake et al. |
| 2017/0242305 A1 | 8/2017 | Liao |
| 2017/0242310 A1 | 8/2017 | Matsushima |
| 2018/0059486 A1 | 3/2018 | Matsushima |

* cited by examiner

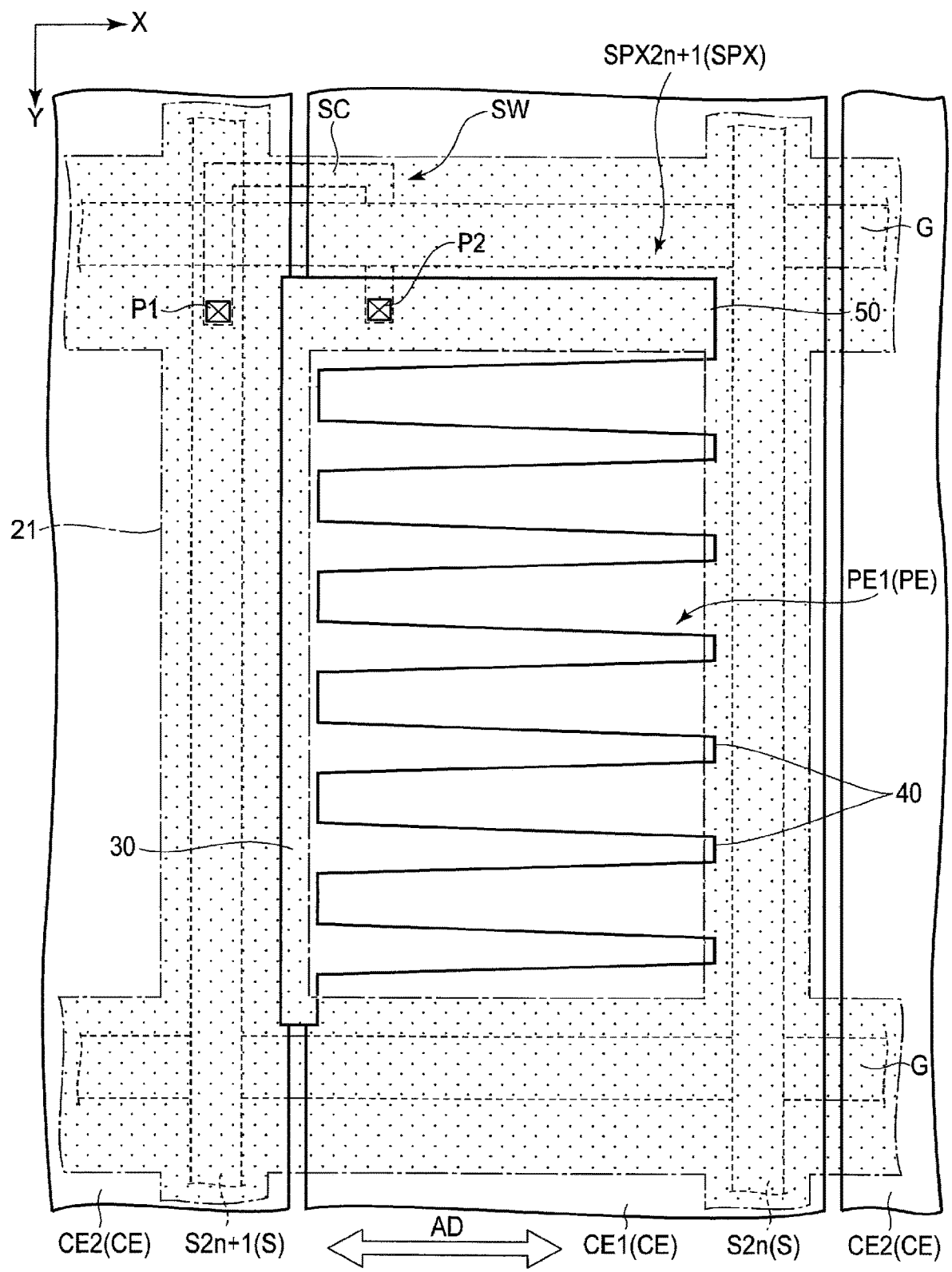
F I G. 4

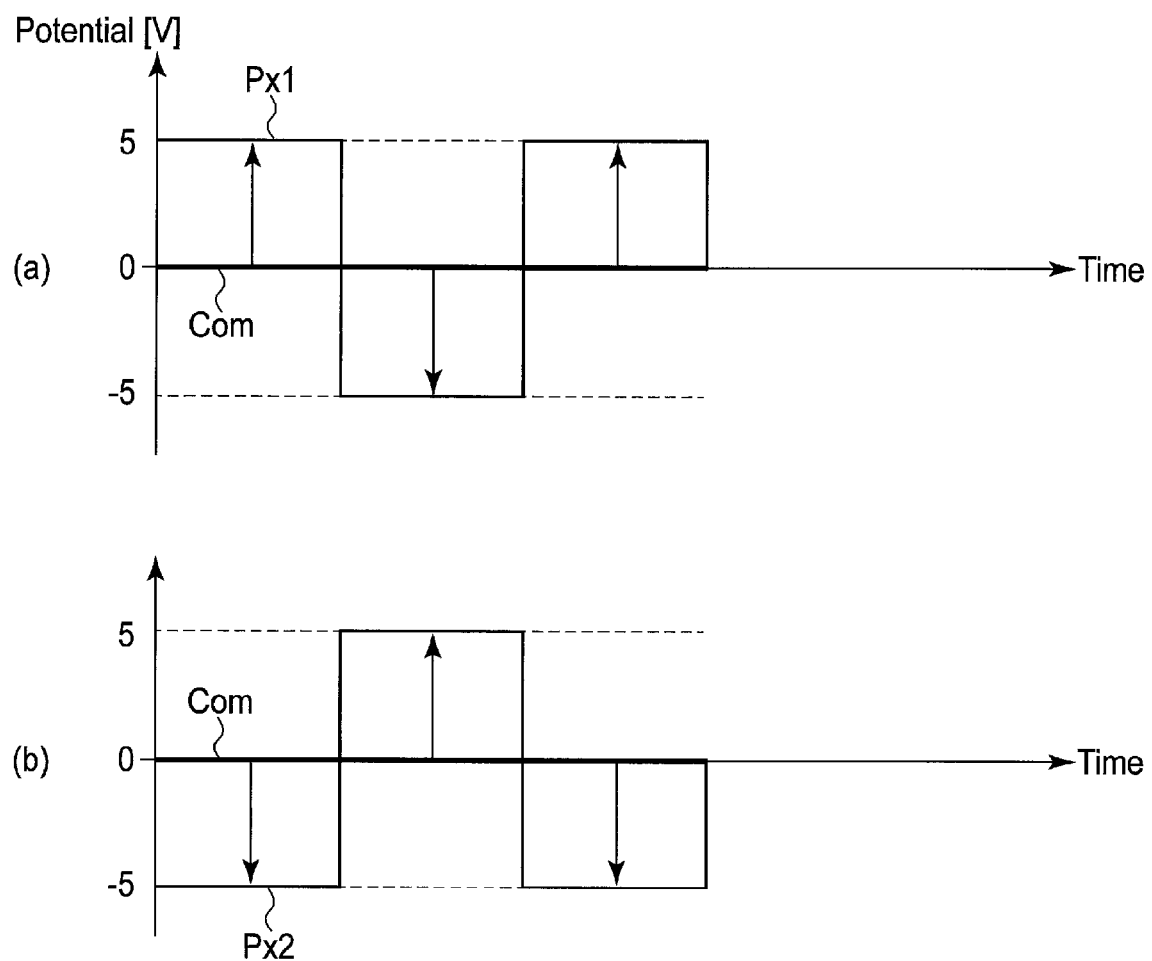
F I G. 8

|  | Potential of CE1 Com1[v] | Potential of PE1 Px1[v] | Potential of CE2 Com2[v] | Potential of PE2 Px2[v] |
|---|---|---|---|---|
| Example 1 | 0 or 5 | 0~5 | 5 or 0 | 5~0 |
| Example 2 | 0 or 3 | 0~5 | 3 or 0 | 3~-2 |
| Comparative example | 0 | 0~5 | 0 | 0~-5 |

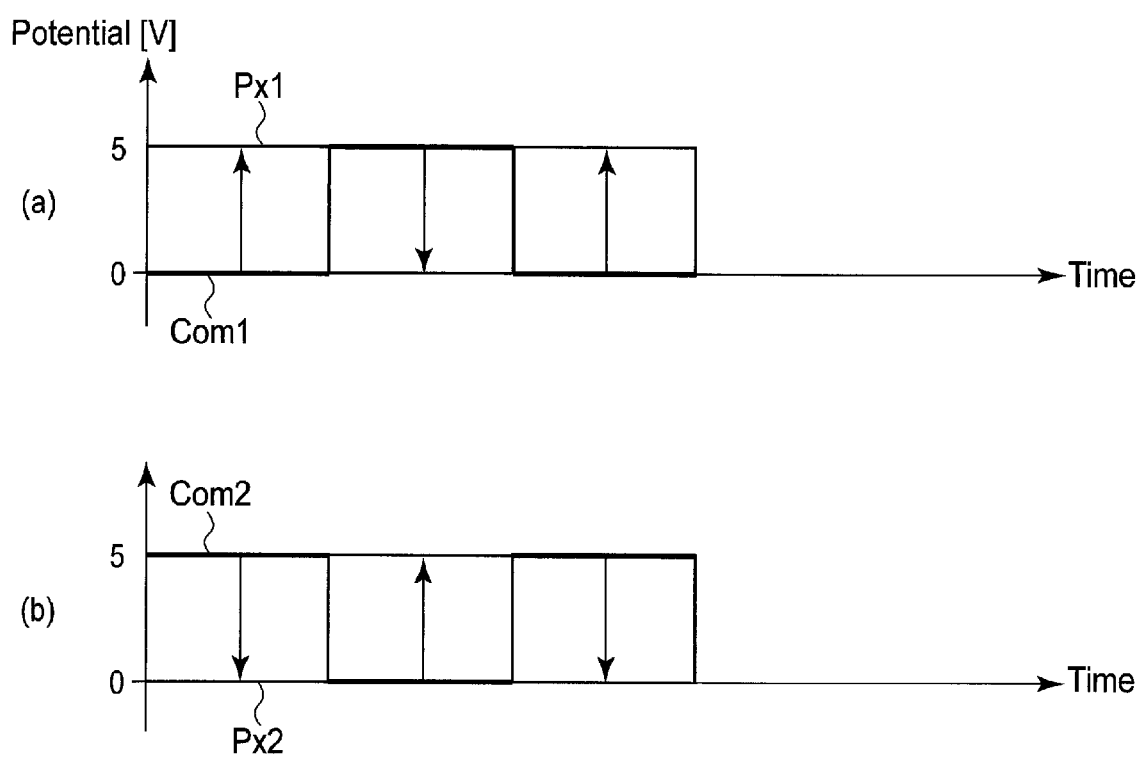
F I G. 13

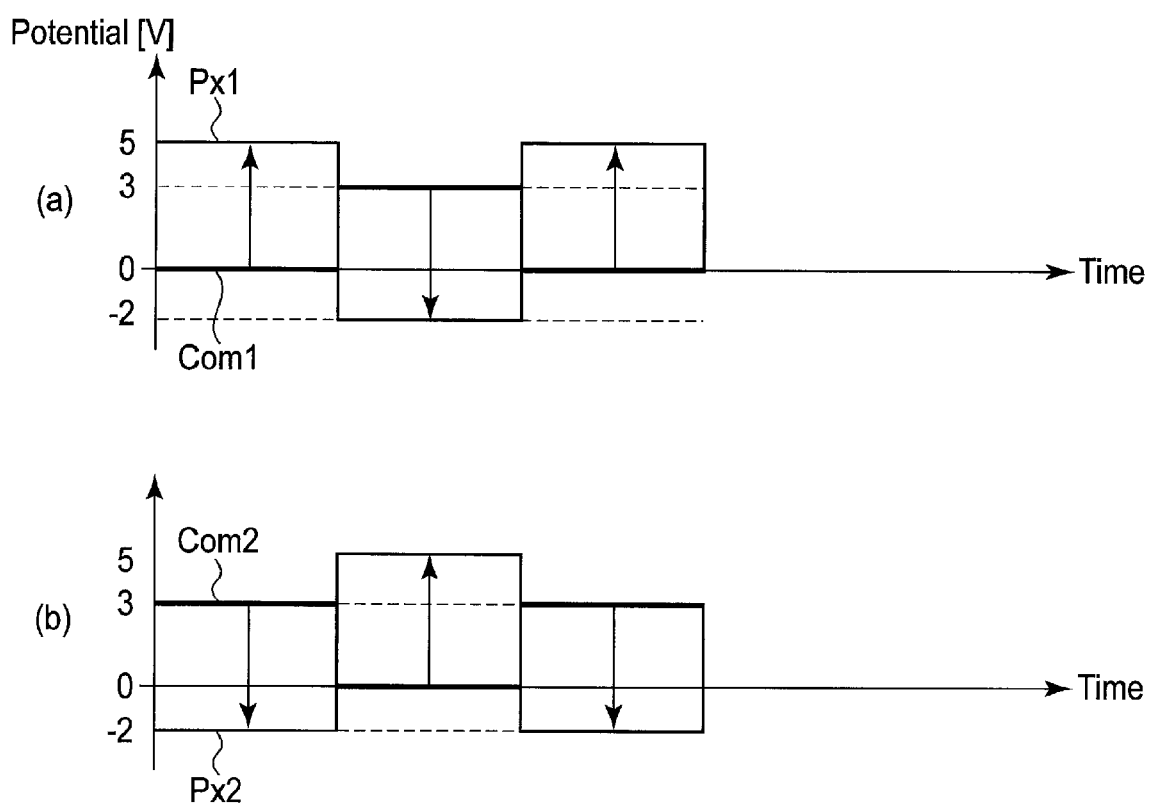
F I G. 16

LIQUID CRYSTAL DISPLAY DEVICE WITH PIXEL ELECTRODES OVERLAPPING A SLIT BETWEEN COMMON ELECTRODES

CROSS-REFERENCE TO RELATED APPLICATIONS

This application is based upon and claims the benefit of priority from Japanese Patent Application No. 2018-084002, filed Apr. 25, 2018, the entire contents of which are incorporated herein by reference.

FIELD

Embodiments described herein generally relate to a liquid crystal display device.

BACKGROUND

An in-plane-switching (IPS) mode liquid crystal display device is known as an example of display devices. In the IPS mode liquid crystal display device, a pixel electrode and a common electrode are provided on one of a pair of substrates facing each other via a liquid crystal layer, and thus the alignment of liquid crystal molecules in the liquid crystal layer is controlled by utilizing a lateral electric field produced between these electrodes. Moreover, a fringe-field-switching (FFS) mode liquid crystal display device has been put in practical use, in which a pixel electrode and a common electrode are disposed on different layers, and the alignment of liquid crystal molecules is controlled by utilizing a fringe electric field produced between these electrodes.

In the meantime, such a liquid crystal display device is also known, that a pixel electrode and a common electrode are disposed on different layers and a slit is made in one of the electrodes, which is closer to the liquid crystal layer, thus allowing liquid crystal molecules located near both sides of the slit along its width direction to rotate in opposite directions to each other. This liquid crystal display device operates on a mode clearly different from the FFS, and can improve the response speed and the alignment stability as compared to the conventional FFS mode. Hereinafter, the structure of this type of liquid crystal display device is called a high-speed response mode.

In the high-speed response mode liquid crystal display device, a region in which unstable alignment occurs may be created by the interaction between electric fields produced near adjacent pixel electrodes. Such a region may cause deterioration in display quality of the liquid crystal display device.

BRIEF DESCRIPTION OF THE DRAWINGS

FIG. 4 is a plan view schematically showing a subpixel shown in FIG. 2.

FIG. 8 is a diagram showing an example of variation in potential of each electrode along with time in a comparative example.

FIG. 13 is a diagram showing an example of variation in potential of each electrode along with time in Example 1.

FIG. 16 is a diagram showing an example of variation in potential of each electrode along with time in Example 2.

DETAILED DESCRIPTION

Figure 1:
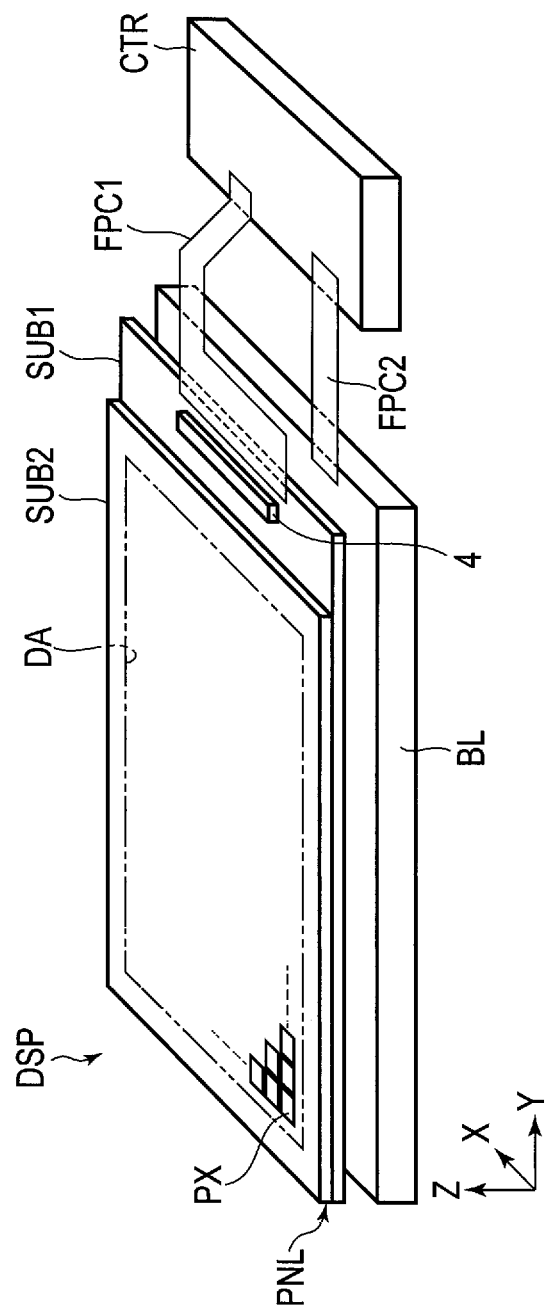
FIG. 1 is a perspective view schematically showing a structure of a liquid crystal display device according to one embodiment.

In general, according to one embodiment, a liquid crystal display device comprises a first substrate, a second substrate opposing the first substrate and a liquid crystal layer disposed between the first substrate and the second substrate. The first substrate comprises a plurality of scanning signal lines, a plurality of video signal lines intersecting the plurality of scanning signal lines, a plurality of pixel electrodes electrically connected to the plurality of video signal lines, respectively, and a plurality of common electrodes. The common electrodes include a plurality of first common electrodes and a plurality of second common electrodes, which are alternately arranged along a first direction. The pixel electrodes include a plurality of first pixel electrodes and a plurality of second pixel electrodes, each including a plurality of linear electrodes extending along the first direction and connection portion connecting ends of the linear electrodes respectively to each other. In each of the first pixel electrodes, the linear electrodes overlap one of the first common electrodes, and the connection portion overlaps a first slit between the one of the first common electrodes and one of the second common electrodes. In each of the second pixel electrodes, the linear electrodes overlap one of the second common electrodes, and the connection portion overlaps a second slit between the one of the second common electrodes and one of the first common electrodes. A first common potential applied to the first common electrodes is different from a second common potential applied to the second common electrodes.

With the structure set out above, a high-speed response mode liquid crystal display device with an improved display quality can be provided.

The embodiments will be described hereinafter with reference to the accompanying drawings. Note that the disclosure is presented for the sake of exemplification, and any modification and variation conceived within the scope and spirit of the invention by a person having ordinary skill in the art are naturally encompassed in the scope of invention of the present application. Moreover, in some cases, in order schematically illustrated as compared to the actual modes. However, the schematic illustration is merely an example, and adds no restrictions to the interpretation of the invention. In the drawings, for identical or similar elements disposed consecutively, reference symbols may be omitted. In addition, in the specification and drawings, the structural elements, which have functions identical or similar to the functions described in connection with preceding drawings, are denoted by like reference numbers, and an overlapping detailed description thereof is omitted unless otherwise necessary.

In each of the embodiments, a transmissive liquid crystal display device will be described as an example of the liquid crystal display device. However, each embodiment does not prevent application of individual technical ideas disclosed in the embodiment to other types of display devices. As display devices of other kinds, for example, a reflective liquid crystal display device which displays images by utilizing external light, or a liquid crystal display device equipped with the functions of both of transmissive and reflective types, or the like is assumed.

FIG. 1 is a schematic perspective view showing a liquid crystal display device DSP of the present embodiment. The liquid crystal display device DSP can be used for various devices such as a smart phone, a tablet computer, a cell phone unit, a personal computer, a television device, an in-vehicle device, a game console and a wearable device.

The liquid crystal display device DSP comprises a display panel (liquid crystal cell) PNL, an illumination device (backlight) BL opposing the display panel PNL, a driver IC 4 which drives the display panel PNL, a control module CTR which controls operation of the display panel PNL and the illumination device BL, and flexible printed circuits FPC1 and FPC2 which transmit control signals to the display panel PNL and the illumination device BL.

The display panel PNL comprises a first substrate SUB1 and a second substrate SUB2 opposing each other, and a liquid crystal layer LC (see FIG. 3) disposed between the substrates SUB1 and SUB2. In the following descriptions, a view from a second substrate SUB2 side of the display panel PNL toward the first substrate SUB1 is defined as plan view. The display panel PNL comprises a display area DA which displays images. The display panel PNL comprises a plurality of pixels PX arrayed in a matrix in the display area DA.

Figure 2:
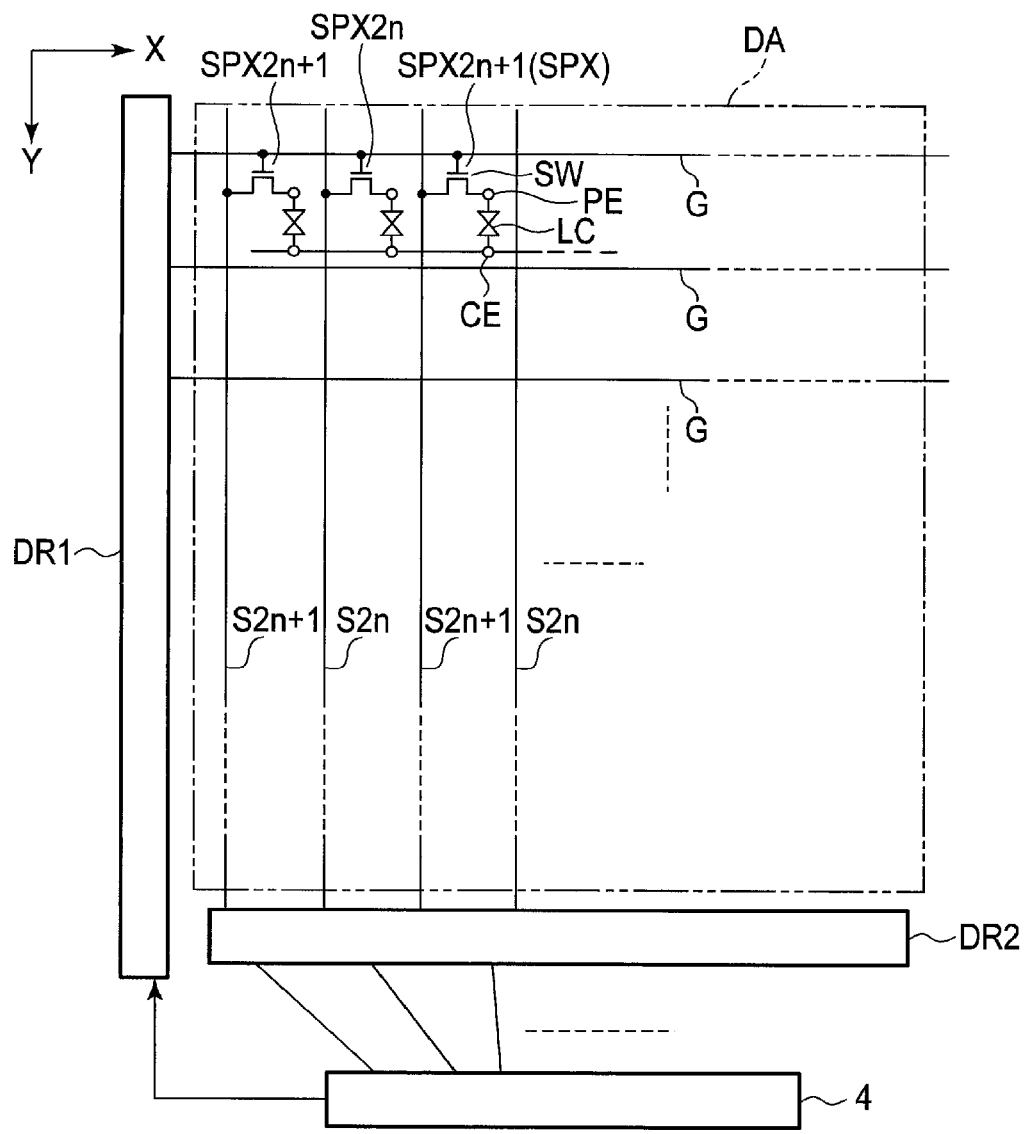
FIG. 2 is a diagram schematically illustrating an equivalent circuit of the liquid crystal display device shown in FIG. 1.

FIG. 2 is a diagram showing a schematic equivalent circuit of the liquid crystal display device DSP. The liquid crystal display device DSP comprises a first driver DR1, a second driver DR2, a plurality of scanning signal lines G connected to the first driver DR1, a plurality of video signal lines S connected to the second driver DR2.

The scanning lines G each extend in the display area DA along the first direction X and are arranged along the second direction Y. The video signal lines S each extend in the display area DA along the second direction Y, and arranged along the first direction X to intersect each scanning signal line G. An example of the first direction X is a direction along a short side of the display panel PNL shown in FIG. 1, and an example of the second direction Y is a direction along a long side of the display panel PNL.

A region partitioned by two video signal lines S adjacent to each other along the second direction Y and two scanning signal lines G adjacent to each other along the first direction X is a subpixel SPX. The video signal lines S include, along the first direction X, odd-numbered video signal lines S$2n$+1 and even-numbered video signal lines S$2n$. Similarly, subpixels SPX include, along the first direction X, odd-numbered subpixels SPX$2n$+1 and even-numbered subpixels SPX$2n$.

A pixel PX which can display in color can be constituted by combining, for example, three subpixels SPX corresponding respectively to red, green and blue. Note that the pixel PX may also include a subpixel SPX of some other color, such as white, and may also include a plurality of subpixels SPX of the same color. The subpixels SPX each comprise a switching element SW, a pixel electrode PE and a common electrode CE opposing the pixel electrode PE.

The pixel electrodes PE and the common electrodes CE are formed in the first substrate SUB1. The common electrodes CE are formed over a plurality of subpixels SPX along the second direction Y (see FIG. 7). The switching elements SW are electrically connected to each respective one of the scanning signal lines G, video signal lines S and pixel electrodes PE. The first driver DR1 consecutively supplies scanning signals to the scanning signal lines G. The second driver DR2 selectively supplies video signals to the video signal lines S.

When a video signal of a video signal line S is supplied to a respective switching element SW while a scanning signal of a scanning signal line G is supplied to the switching element SW, a potential according to the video signal is applied to the pixel electrode PE. Thus, an electric field produced between the pixel electrode PE and the common electrode CE, the alignment of the liquid crystal molecules of the liquid crystal layer LC varies from the initial alignment state where voltage is not being applied. Thus, an image is displayed on the display area DA.

Figure 3:
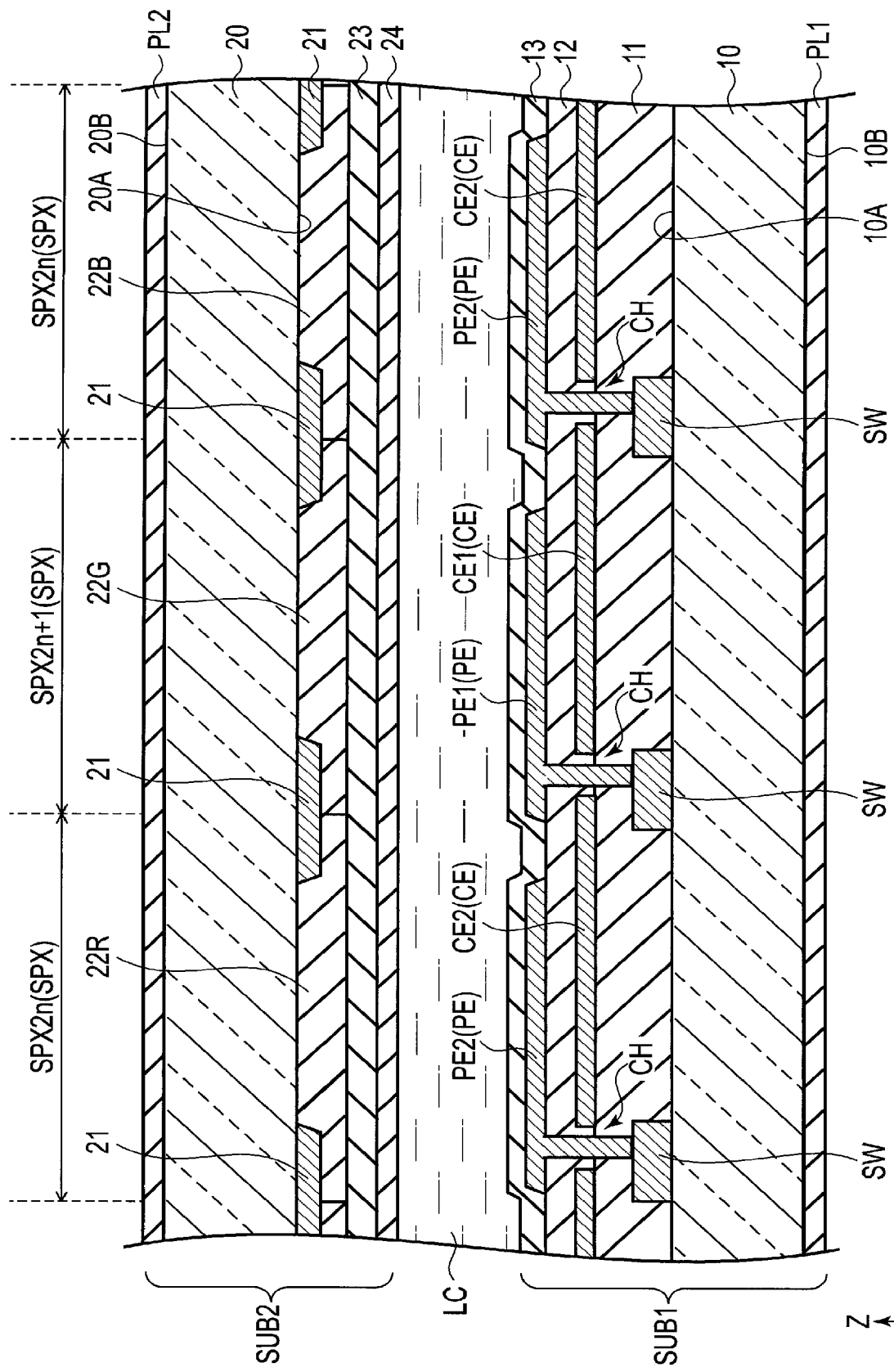
FIG. 3 is a schematic cross-sectional view of the display panel shown in FIG. 1.

FIG. 3 is a schematic cross-sectional view of the display panel PNL. The first substrate SUB1 comprises a first insulation base material 10, a first insulating layer 11, a second insulating layer 12, and a first alignment film 13, in addition to the above-described scanning signal lines G, the video signal lines S, the first driver DR1, the second driver DR2, the switching elements SW, the pixel electrodes PE, the common electrodes CE and the like. The first insulating base 10 is formed from a light-transmissive glass base or resin base material, and includes a first main surface 10A opposing the second substrate SUB2 and a second main surface 10B on an opposite side to the first main surface 10A.

The switching elements SW are provided on the first main surface 10A of the first insulating substrate 10, and are covered by the first insulating layer 11. In example shown in FIG. 3, the illustration of the scanning signal lines G, the video signal lines S and the switching elements SW is simplified for the sake of easier description of the embodiment. In the actual device, the first insulating layer 11 includes a plurality of layers, and the switching elements SW include semiconductor layers and various electrodes formed in these layers.

The common electrodes CE are formed on the first insulating film 11. The common electrodes CE are covered by the second insulating film 12. The pixel electrodes PE are formed on the second insulating film 12 and oppose the respective common electrodes CE. The pixel electrodes PE are each electrically connected to the switching element SW of the respective subpixel SPX via a contact hole CH.

The pixel electrodes PE and the common electrodes CE can be formed of a transparent conductive material such as indium tin oxide (ITO) or indium zinc oxide (IZO). The first alignment film 13 covers the pixel electrodes PE, and is in contact with the liquid crystal layer LC. An alignment treatment such as a rubbing treatment or a light alignment treatment is applied to the first alignment film 13.

The second substrate SUB2 comprises a second insulating base 20 formed from a light-transmissive glass base, resin base or the like. The second insulating base 20 includes a third main surface 20A opposing the first substrate SUB1, and a fourth main surface 20B on an opposite side to the third main surface 20A. Further, the second substrate SUB2 comprises light-shielding layers 21, color filters 22R, 22G and 22B corresponding to red, green and blue, respectively, an overcoat layer 23 and a second alignment film 24. As in the case of the first alignment film 13, an alignment treatment such as a rubbing treatment or a light alignment treatment is applied to the second alignment film 24.

In plan view, each light-shielding layer 22 is provided in each respective boundary between subpixels SPX. The overcoat layer 23 covers the color filters 22R, 22G and 22B and planarizes the surfaces thereof. The second alignment film 24 covers the overcoat layer 23, and is in contact with the liquid crystal layer LC. A first polarizer PL1 is disposed on the second main surface 10B of the first insulating base 10, and a second polarizer PL2 is disposed on the fourth main surface 20B of the second insulating base 20.

FIG. 4 is a plan view schematically showing an example of the subpixels SP. Each subpixel SPX comprises the above-described switching element SW, pixel electrode PE, common electrode CE and the like. The pixel electrode PE includes a connection portion 30 extending in the second direction Y, a plurality of linear electrodes 40 extending from the connection portion 30 in the first direction X, and an end portion 50.

The linear electrodes 40 are comb-teeth-shaped electrodes and are each formed into, for example, such a shape which tapers off towards its tip. The end portion 50 extends from the connection portion 30 in the first direction X as in the case of the linear electrodes 40. The end portion 50 is formed wider than the linear electrodes 40 along the second direction Y. The connection portion 30 connects the end portion 50 and ends of the linear electrodes 40 to each other.

The switching element SW includes a semiconductor layer SC. The semiconductor layer SC is connected to the respective video signal line S at a connective position P1 and to the first electrode E1 at a connective position P2. The connecting position P2 is provided, for example, in the end portion 50. In the example shown in FIG. 4, the switching element SW is of a double-gate type, in which the semiconductor layer SC intersects the scanning signal line G twice. Note that the switching element SW may be of a single-gate type in which it intersects the scanning signal line G only once.

The light-shielding layer 21 described above corresponds to the part indicated by hatching of dots in FIG. 4, and overlaps the respective scanning signal lines G, video signal lines S, and switching elements SW in plan view. In the example shown in FIG. 4, the light-shielding layer 21 overlaps a part of the connection portion 30 and also a distal end of the linear electrode 40. The light-shielding layer 21 may overlap the connection portion 30 entirely.

The above-described first and second alignment films 13 and 24 are subjected to an alignment treatment along an alignment treatment direction AD, which is parallel to the first direction X, so as to have a function of aligning the liquid crystal molecules LM, which will be described later, along in the initial alignment direction parallel to the alignment treatment direction AD. That is, in this embodiment, the extending direction of the linear electrodes 40 coincides with the initial alignment direction of the liquid crystal molecules LM.

In such structure, a high-speed response mode, which is quicker than the general FFS mode can be realized. Note that the response speed can be defined as the speed of transition between predetermined levels in light transmissivity of the liquid crystal layer LC, which occur as applying voltage between a pixel electrode PE and a common electrode CE, for example.

Figure 5:
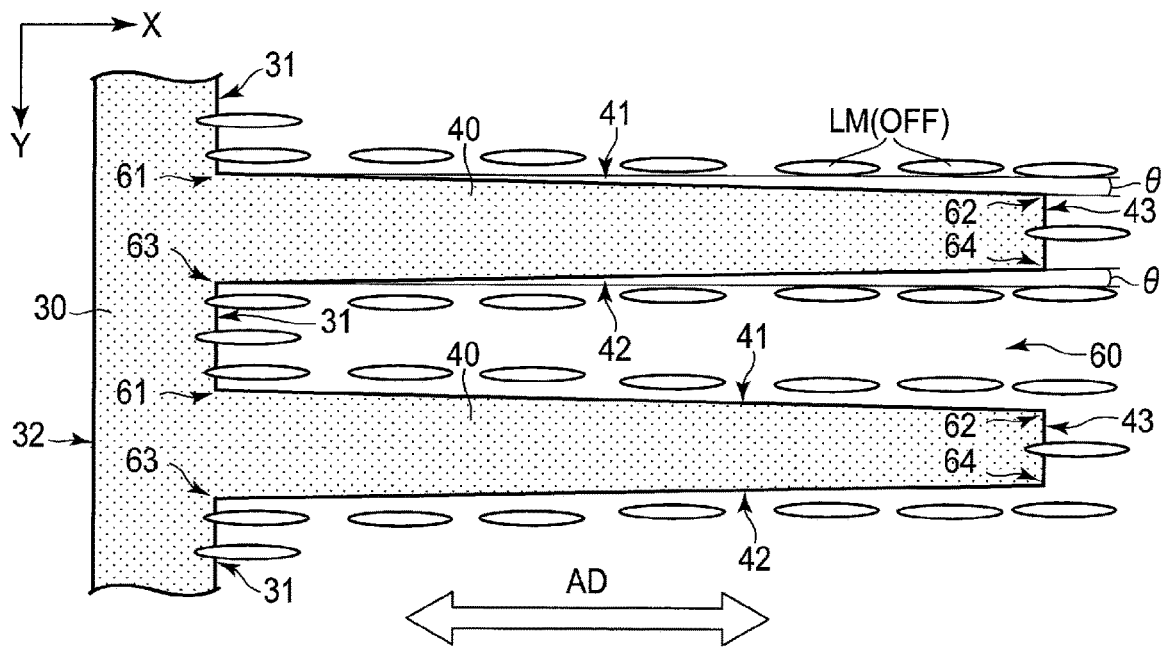
FIG. 5 is a diagram illustrating an initial alignment state of liquid crystal molecules in an off-state where voltage is not being applied.

The operation principle of the high-speed response mode will now be described with reference to FIGS. 5 and 6. FIG. 5 is a plan view showing a part of the pixel electrode PE, and the initial alignment state of the liquid crystal molecules LM in the liquid crystal layer LC. The linear electrodes 40 each includes a first side 41 and a second side 42 along the width direction (the second direction Y).

Further, each linear electrode 40 includes a top side 43 connecting the first side 41 and the second side 42 in the distal end. The first side 41 is inclined by an acute angle of angle θ (for example, about 1.0 degree) clockwise with respect to the alignment treatment direction AD, and the second side 42 is inclined by angle θ counter-clockwise with respect to the alignment treatment direction AD.

Between two adjacent linear electrodes 40, the connection portion 30 includes a bottom side 31. The connection portion 30 further includes an outer side 32 on an opposite side to the bottom side 31. Between the two adjacent linear electrodes 40, a recess 60 (a slit region) is formed as surrounded by the first side 41, the second side 42 and the bottom side 31.

A first corner 61 is formed by the bottom side 31 and the first side 41, a second corner 62 is formed by the first side 41 and the top side 43, a third corner 63 is formed by the bottom side 31 and the second side 42, and a fourth corner 64 is formed by the second side 42 and the top side 43.

In the off state where voltage is not being applied between the pixel electrode PE and the common electrode CE, the liquid crystal molecules LM are initially aligned so that the longitudinal axes thereof coincide with the alignment treatment direction AD as shown in FIG. 5. In the FFS mode, which is generally widely used, when a fringing field is formed between two electrodes, all liquid crystal molecules rotate in the same direction. On the other hand, rotation of the liquid crystal molecules LM in the liquid crystal mode of this embodiment is different from rotation of the liquid crystal molecules in the FFS mode.

Figure 6:
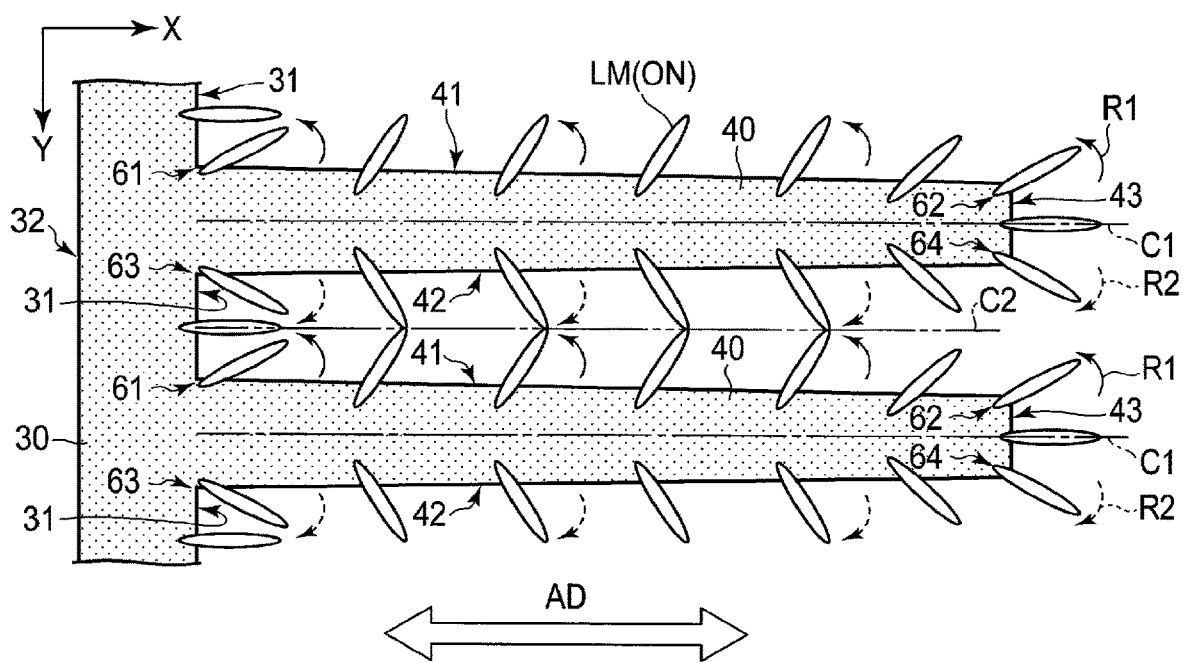
FIG. 6 is a diagram illustrating an alignment state of the liquid crystal molecules in an on-state where voltage is being applied.

FIG. 6 is a diagram showing an alignment state of the liquid crystal molecules LM in the on state where voltage is being applied between the pixel electrode PE and the common electrode CE. In this embodiment, the liquid crystal molecules LM have a positive dielectric anisotropy. Therefore, if voltage is applied between the pixel electrode PE and the common electrode CE from the off state shown in FIG. 5, a force acts on the liquid crystal molecules LM to rotate so that the longitudinal axes thereof are aligned parallel (or normal to the equipotential line) with respect to the direction of the electric field thus produced.

In the shape of the pixel electrodes PE applied in this embodiment, the direction of rotation of the liquid crystal molecules LM varies from one location to another. In the vicinities of the first and second corners 61 and 62, liquid crystal molecules LM rotate in a first rotational direction R1 indicated by an arrow of a solid line. In the vicinities of the third and fourth corners 61 and 62, liquid crystal molecules LM rotate in a second rotational direction R2 indicated by an arrow of a broken line. The first rotational direction R1 is different from, that is, opposite to the second rotational direction R2.

The first to fourth corners 61, 62, 63 and 64 have a function of controlling the first and second rotational directions R1 and R2 of liquid crystal molecules LM in the vicinities of the first and second sides 41 and 42 and stabilizing the alignment. More specifically, those of the liquid crystal molecules LM in the vicinity of the first side 41 rotate in the first rotational direction R1 in response to the influence of the rotation of those of the liquid crystal molecules LM in the vicinities of the first and second corners 61 and 62. Similarly, those of the liquid crystal molecules LM in the vicinity of the second side 42 rotate in the second rotational direction R2 in reply to the rotation of those of the liquid crystal molecules LM in the vicinities of the third and fourth corners 63 and 64.

On the other hand, in the vicinities of a center C1 of the linear electrode 40 along the second direction Y and a center C2 of the recess 60, liquid crystal molecules LM urged to rotate in the first rotational direction R1, and liquid crystal molecules LM urged to rotate in the second rotational direction R2 antagonize to each other. Therefore, the liquid crystal molecules LM in these regions are maintained in the initial alignment state, and thus hardly rotate.

As described above, in the high-speed response mode, the first and second rotational directions R1 and R2 of the liquid crystal molecules LM are aligned respectively with each other from the bottom side 31 to the top side 43 in the vicinities of the first side 41 and the second side 42. Thus, the response speed at the time of applying voltage can be increased and also the variation in the first and second rotational directions R1 and R2 of the liquid crystal molecules LM can be suppressed, thus making it possible to improve the stability of alignment.

Note that as shown in FIGS. 5 and 6, the first and second sides 41 and 42 of the linear electrodes 40 are inclined with respect to the alignment treatment directions AD. This structure also contributes to the improvement of the stability of alignment. That is, in the vicinities of the first and second sides 41 and 42 inclined to the alignment treatment direction AD, the directions of the electric fields intersect at angles other than right angles with respect to the alignment treatment direction AD. Thus, the first and second rotational directions R1 and R2 of the liquid crystal molecules LM while applying voltage can be set substantially constant.

Figure 7:
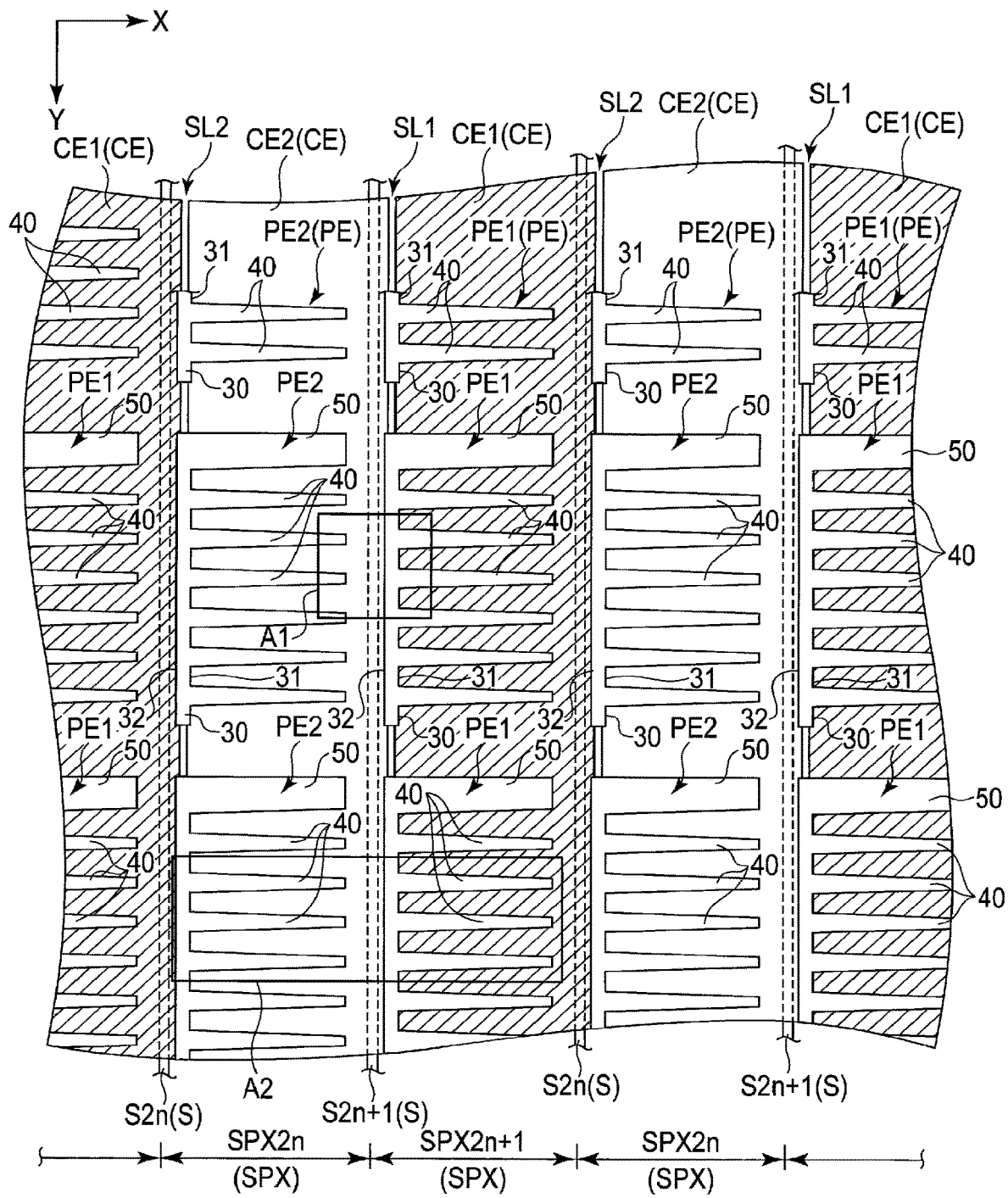
FIG. 7 is a plan view schematically showing a spatial relationship between pixel electrodes and common electrodes in this embodiment.

In the high-speed response mode liquid crystal display device DSP described above, in order to stabilize the alignment of the liquid crystal molecules LM, it is necessary to devise a relationship not only between elements disposed in each subpixel SPX, but also subpixels $SPX2n+1$ and $SPX2n$ adjacent to each other along the first direction X. FIG. 7 is a plan view schematically showing a spatial relationship between pixel electrodes PE and common electrodes CE in this embodiment.

In the liquid crystal display device DSP of this embodiment, as shown in FIG. 7, the common electrodes CE include the first and second common electrodes CE1 and CE2 alternately arranged along the first direction X. Further, the connection portion 30 of each the pixel electrodes PE overlaps the respective first and second slits SL1 and SL2 located between the respective first common electrode CE1 and the respective second common electrode CE2 in plan view. In the example of FIG. 7, the first and second slits SL1 and SL2 do not overlap each of a plurality of video signal lines S.

As shown in FIGS. 4 and 7, the first common electrode CE1 is formed to have a width substantially equal to that of the subpixel SPX along the first direction X, and extends along the second direction Y. The most of the first common electrode CE1 is located in an odd-numbered subpixel $SPX2n+1$. An electric field is produced between the first common electrode CE1 and the first pixel electrode PE1 disposed in the odd-numbered subpixel $SPX2n+1$.

A part of the first common electrode CE1 extends out to an adjacent even-numbered subpixel $SPX2n$, and overlaps the even-numbered video signal line $S2n$ in plan view. Similarly, the second common electrode CE2 is formed to have a width substantially equal to that of the subpixel SPX along the first direction X, and overlaps an odd-numbered video signal line $S2n+1$ in plan view while extending along the second direction Y.

A plurality of pixel electrodes PE disposed in the display area DA include a plurality of first pixel electrodes PE1 and a plurality of second pixel electrodes PE2. Along the first direction X, the first pixel electrodes PE1 and the second pixel electrodes PE2 are alternately arranged. The first pixel electrodes PE1 are arranged along the second direction Y, and are electrically connected to the respective odd-numbered video signal lines $S2n+1$. Similarly, the second pixel electrodes PE2 are arranged along the second direction Y, and are electrically connected to the respective even-numbered video signal lines $S2n$.

In these first pixel electrodes PE1, the linear electrodes 40 and the end portions 50 overlap one first common electrode CE1 in plan view. Further, in the first pixel electrodes PE1, the connection portions 30 overlap the respective first slits SL1 each located between the respective first common electrode CE1 and the respective second common electrode CE2 in plan view. The connection portion 30 of each first pixel electrode PE1 has a width greater than that of the first slit SL1, and overlap both respective first and second common electrodes CE1 and CE2 in plan view.

Similarly, in the second pixel electrodes PE2, the linear electrodes 40 and the end portions 50 overlap one respective second common electrode CE2 in plan view. Further, in the second pixel electrodes PE2, the connection portions 30 overlap the respective second slits SL2 each located between the respective second common electrode CE2 and the respective first common electrode CE1 in plan view. The connection portion 30 of each second pixel electrode PE2 has a width greater than that of the second slits SL2, and overlaps both respective first and second common electrodes CE1 and CE2 in plan view.

According to this embodiment, common electrode CE is divided into a first common electrode CE1 and a second common electrode CE2, and thus different common potentials can be respectively applied to the common electrodes CE of subpixels $SPX2n+1$ and $SPX2n$ adjacent to each other.

Here, the case where the common electrodes CE each are not divided, and the same potential is applied to common electrodes CE of adjacent subpixels $SPX2n+1$ and $SPX2n$, will be described as a comparative example.

FIG. 8 is a diagram showing an example of variation in potential of each electrode along with time in the comparative example. In the following description, the potential to be applied to a common electrode CE in an arbitrary frame is referred to as the common potential (base potential) Com. Moreover, in the frame, the potential of the video signal supplied from an odd-numbered video signal line S2n+1 to the first pixel electrode PE1 is set to Px1, and the potential of the video signal supplied from an even-numbered video signal line S2n to the second pixel electrode PE2 is set to Px2.

FIG. 8, in its part (a), shows the potentials of the common electrode CE and the first pixel electrode PE1, and part (b) shows the potentials of the common electrode CE and the second pixel electrode PE2. In the example of FIG. 8, the common potential Com is fixed to 0V. Moreover, in a certain frame, a potential Px1 of a video signal is applied to the first pixel electrode PE1 in a range of 0 to 5V, and a potential Px2 of the video signal is applied to the second pixel electrode PE2 in a range of 0 to −5V. The potential Px1 of the video signal and the potential Px2 of the video signal have polarities reversal to each other.

Figure 9:
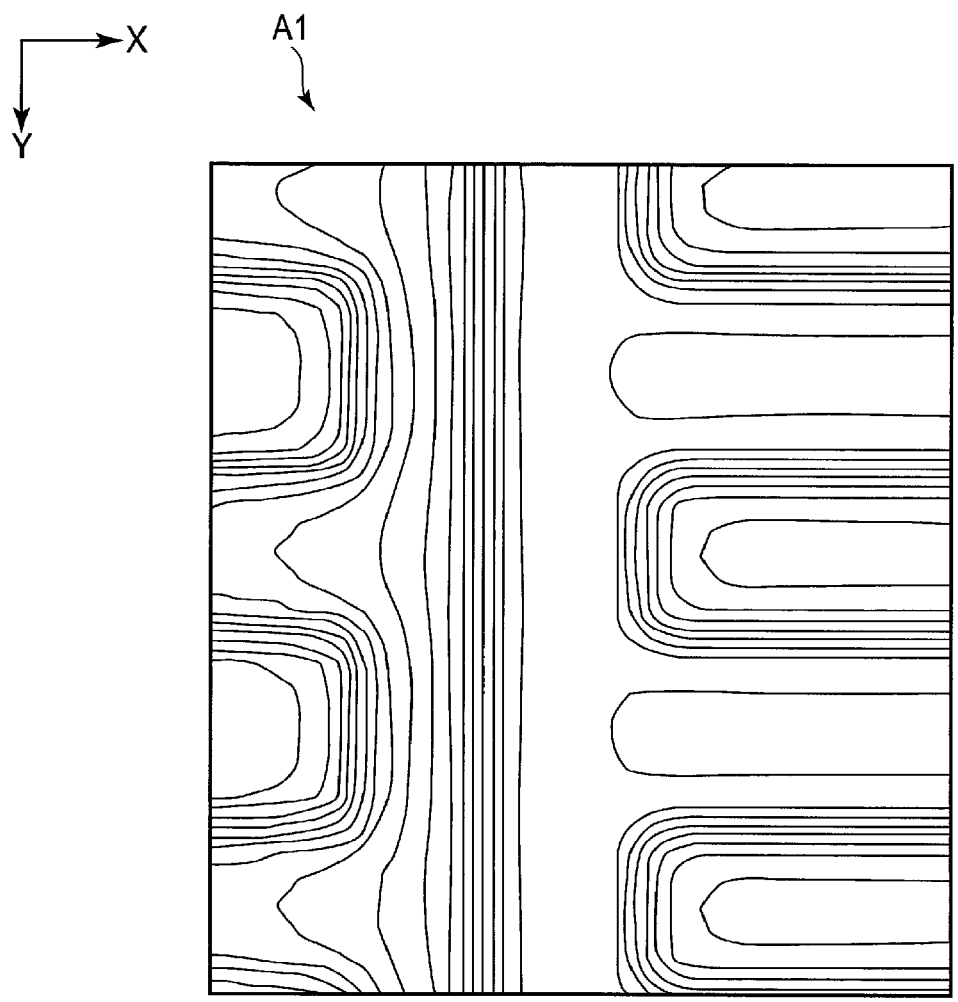
FIG. 9 is a diagram showing an equipotential line in an area A1 shown in FIG. 7 when the potential of the comparative example is being applied.
Figure 10:
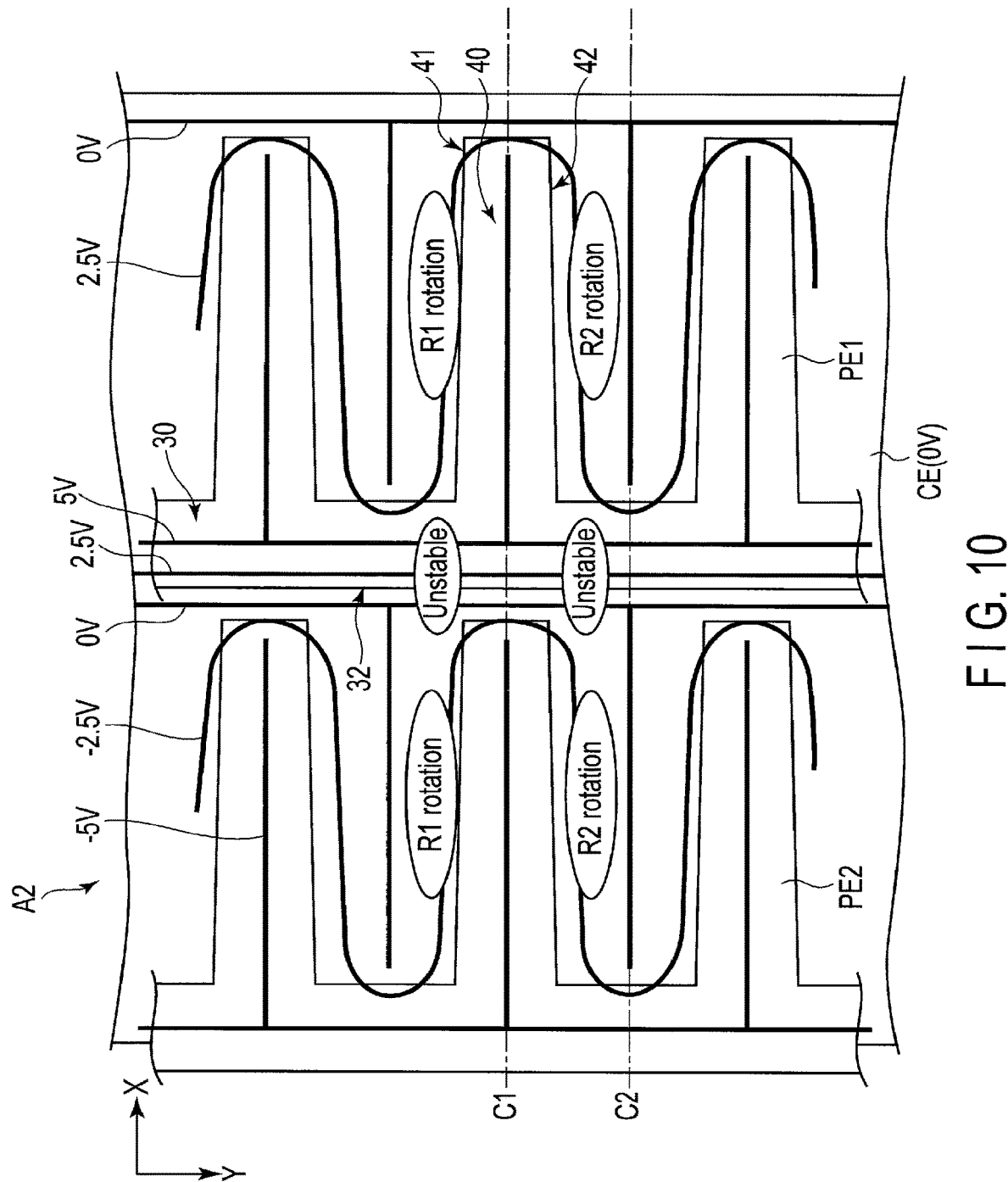
FIG. 10 is a diagram schematically illustrating locations in an area A2 shown in FIG. 7, where potentials are 5V, 2.5V, 0V, −2.5V and −5V when the potential of the comparative example is being applied.

FIG. 9 is a diagram showing equipotential lines in the area A1 enclosed by a solid line in FIG. 7 when applying such potential as of the comparative example to each electrode. The equipotential lines in FIG. 9 are equivalent to the state where 5V is applied to the first pixel electrode PE1 and −5V to the second pixel electrode PE2 in the example of driving shown in FIG. 8. FIG. 10 is a diagram schematically showing locations where the potential is 5V, 2.5V, 0V, −2.5V and −5V in the area A2 enclosed by the solid line in FIG. 7 when such potential as of the above-described comparative example is applied to each electrode.

As shown in FIGS. 9 and 10, at the locations where the first pixel electrodes PE1 and the second pixel electrodes PE2 are adjacent respective to each other, linear equipotential lines along the first direction X are far apart from each other along the second direction Y on the connection portions 30 of the respective first pixel electrodes PE1, and the common electrodes CE each between the respective first pixel electrode PE1 and the respective second pixel electrode PE2. More specifically, in the example shown in FIG. 10, equipotential lines of 5V and 2.5V extend along the second direction Y in the regions which overlap the connection portions 30, and an equipotential line of 0V extends along the second direction Y in the regions each between the respective first pixel electrode PE1 and the respective second pixel electrode PE2. The rotational direction of the liquid crystal molecules LM is determined by the extending direction of the equipotential lines, but in locations which such linear equipotential lines are widely distributed, the alignment state of the liquid crystal molecules LM may become unstable undesirably.

Figures 11, 12:
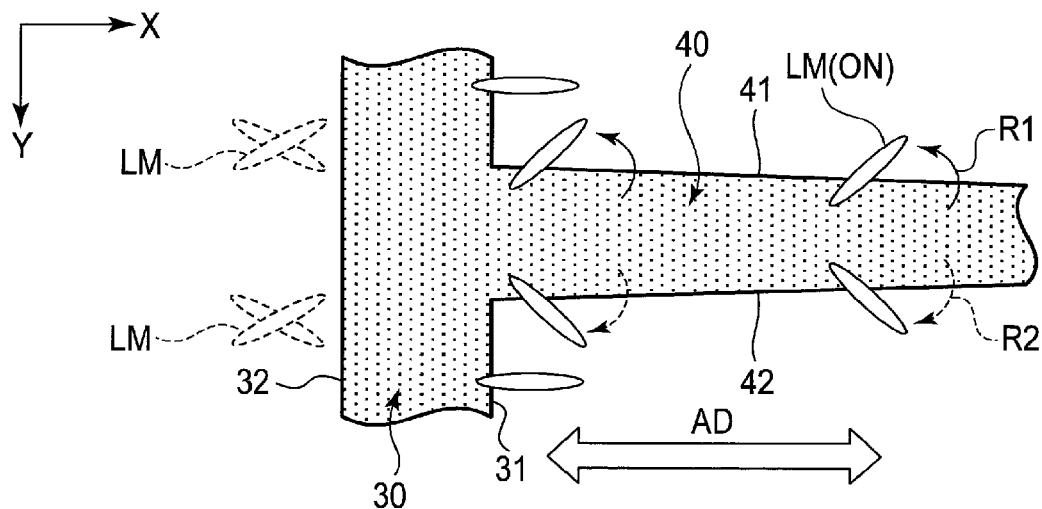
FIG. 11 is an enlarged plan view of a connection portion of a pixel electrode and one end of a linear electrode.
FIG. 12 is a diagram showing an example of potential of each electrode in two examples and the comparative examples of this embodiment.

FIG. 11 is an expanded plan view of a connection portion 30 of a pixel electrode, and an end of a linear electrode 40. As shown in FIG. 11, in a bottom side 31 side of the connection portion 30, the rotational directions of the liquid crystal molecules LM are stably uniform. On the other hand, in the vicinity of equipotential lines cross the alignment treatment direction AD at right angles, and therefore the liquid crystal molecules LM may rotate in the first or second rotational direction R1 or R2.

In such a state, as shown in FIG. 10, liquid crystal molecules LM in the vicinity of the first side 41 of the linear electrode 40 rotate uniformly in the first rotational direction R1 on the same straight line along the first direction X, whereas liquid crystal molecules LM in the vicinity of the outer side 32 may rotate in the second rotational direction R2. Similarly, on the same straight line along the first direction X, liquid crystal molecules LM in the vicinity of the second side 42 of the linear electrode 40 rotate uniformly in the second rotational direction R2, whereas liquid crystal molecules LM in the vicinity of the outer side 32 may rotate in the first rotational direction R1.

If the rotational directions of the liquid crystal molecules LM are irregular on the same straight line along the first direction X, the response speed of the liquid crystal molecules LM in the vicinity of the first and second sides 41 and 42 becomes slow, and further leakage of light may undesirably occur.

With regard to this, according to the structure of this embodiment, the common electrodes CE are separated from the respective rows of subpixels SPX, and therefore potential to be applied can be varied between two adjacent common electrodes.

FIG. 12 is a diagram indicating an example of potential of the electrode in each of the two examples of this embodiment and the above-described comparative example. In the following description, the potential applied to the first common electrode CE1 is referred Com1, and the potential applied to the second common electrode CE2 is referred to as the second common potential (second base potential) Com2.

In Example 1, first common potentials Com1 of 0V and 5V are alternately applied to the first common electrode CE1, and second common potentials Com2 of 5V and 0V are applied to the second common electrode CE2. Further, to the first pixel electrode PE1, a potential Px1 of a video signal is applied in a range of 0 to 5V, and to the second pixel electrode PE2, a potential Px2 of a video signal is applied in a range of 5 to 0V. An example of variation in the potential of each electrode with time in Example 1 is shown in FIG. 13.

FIG. 13, in its part (a), shows the potential of the first common electrode CE1 and the first pixel electrode PE1, and its part (b) shows the potential of the second common electrode CE2 and the second pixel electrode PE2. In the example of FIG. 13, when the first common potential Com1 is 0V, the second common potential Com2 is set to 5V, and on the basis of the potentials, potentials Px1 and Px2 of video signals which have different polarities are applied to the first pixel electrode PE1 and the second pixel electrode PE2, respectively.

Figure 14:
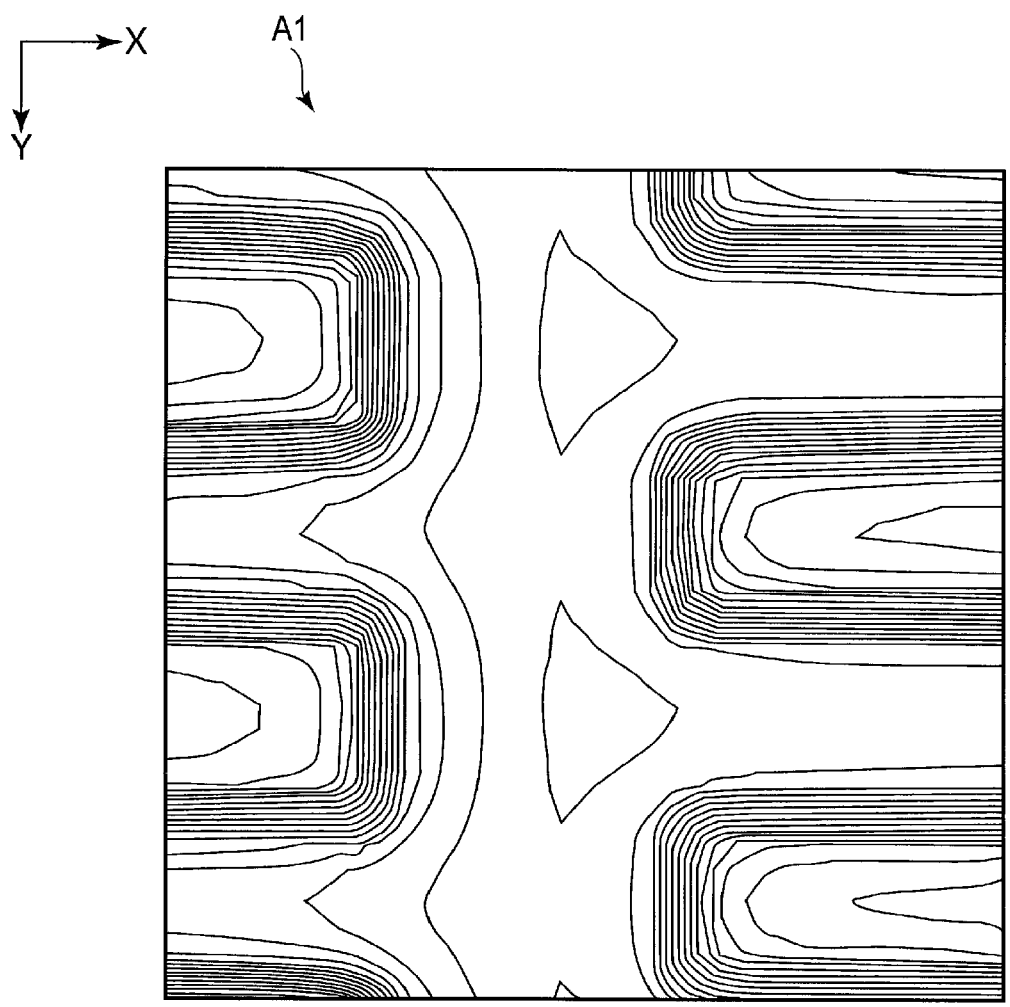
FIG. 14 is a diagram showing an equipotential line in the area A1 shown in FIG. 7 when the potential of Example 1 is being applied.
Figure 15:
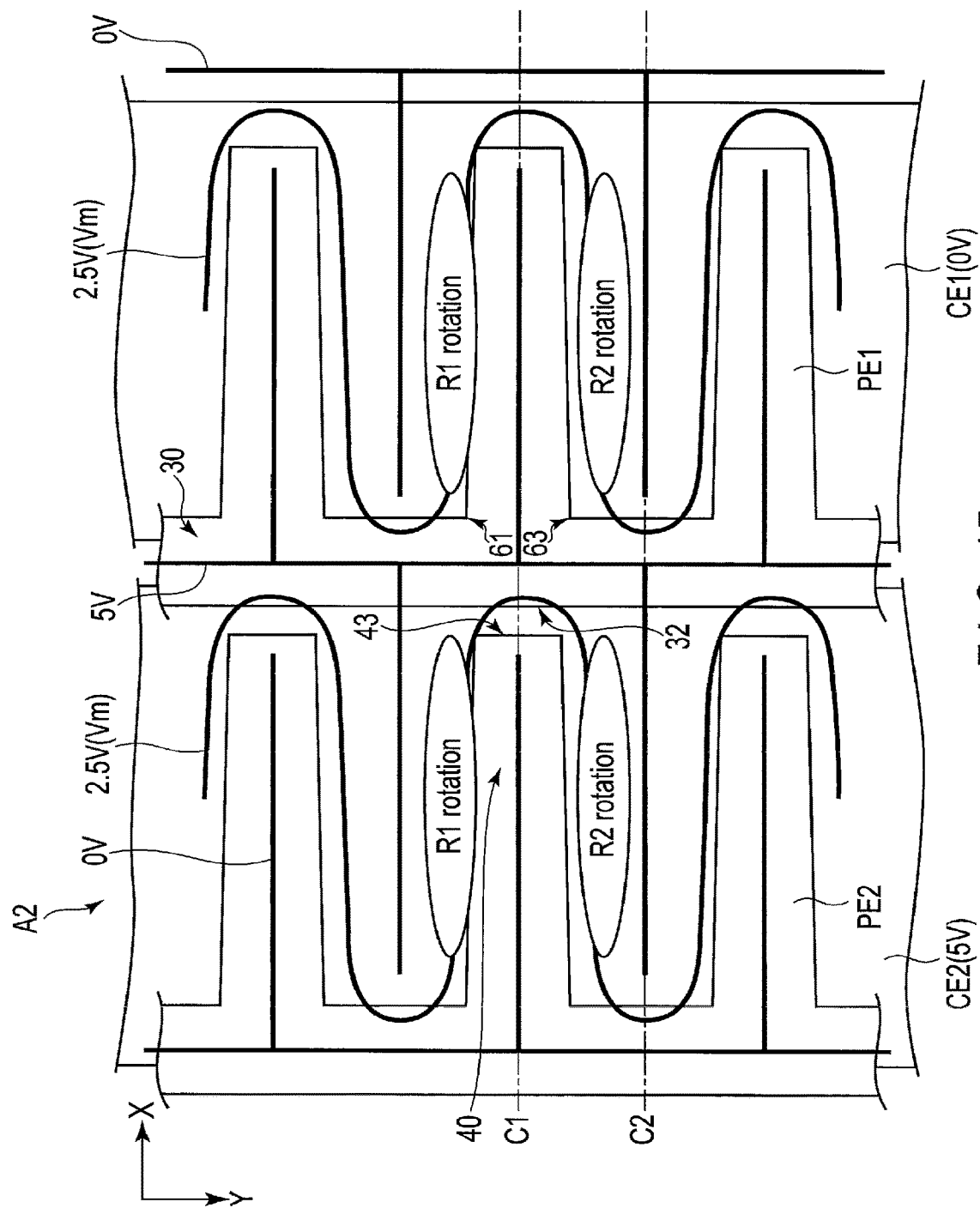
FIG. 15 is a diagram schematically illustrating locations in the area A2 shown in FIG. 7, where potentials are 5V, 2.5V and 0V when the potential of Example 1 is being applied.

FIG. 14 is a diagram showing equipotential lines in the area A1 shown in FIG. 7 when applying such a potential as of Example 1 to each electrode. FIG. 15 schematically shows locations where the potential is 5V, 2.5V and 0V in the area A2 in FIG. 7 when such potential as of this example is applied to each electrode.

Unlike the comparative example shown in FIG. 10, in the example shown in FIG. 15, linear equipotential lines along the second direction Y in the vicinity of the connection portion 30 do not appear to be so far apart from each other along the first direction X. That is, curved equipotential lines Vm of middle potential are generated on the connection portion 30 as well. Here, the equipotential lines Vm of the mediate potential are equipotential lines equivalent to middle potentials between those of the first common electrode CE1 and the first pixel electrode PE1, and middle potentials of those between the second common electrode CE2 and the second pixel electrode PE2. In FIG. 15, equipotential lines of 2.5V are equivalent to this.

Thus, in the state where the equipotential lines Vm of mediate potential crosses with the connection portion 30 of adjacent pixel electrodes at a certain degree of inclination in the vicinity of the top side 43 of the linear electrode 40, the rotational directions of the liquid crystal molecules LM tend to be set uniform. Thus, the liquid crystal molecules LM in the vicinities of the first corner 61, the third corner 63, and the outer side 32 are stably aligned.

As described above, in Example 1 of FIG. 13, the first common potential Com1 alternately varies between 0V and 5V from one frame to another. The second common potential Com2 is at antiphase to the first common potential Com1 and alternates between 5V and 0V. 0V is an example of the first potential, and 5V is an example of the second potential, which is higher than the first potential.

In a frame where the first common potential Com1 is 0V and the second common potential Com2 is 5V, the potential Px1 of the video signal to be supplied to the first pixel electrode PE1 is in a range from 0V, which is equal to the first common potential Com1, to 5V, which is equal to the second common potential Com2. In this frame, the potential Px2 of the video signal to be supplied to the second pixel electrode PE2 is in a range from 5V, which is equal to the second common potential Com2, to 0V, which is equal to the first common potential Com1.

In the even-numbered subpixels SPX2$n$, the amount of light transmitted by the liquid crystal layer LC is adjusted according to the potential difference between the first common potential Com1 and the potential Px1 of the video signal. Similarly, in the odd-numbered subpixels SPX2$n$+1, the amount of light transmitted by the liquid crystal layer LC is adjusted according to the potential difference between the second common potential Com2 and the potential Px2 of the video signal.

According to Example 1 described above, the linear equipotential lines extending along the second direction Y significantly decrease as compared with the comparative example shown in FIG. 8, and therefore the alignment state of the liquid crystal molecules LM is stabilized. Further, in Example 1, the amplitude from the first potential to the second potential is the same as the potential difference by which the electric field acting on the liquid crystal molecules LM is at the maximum. Since the potential difference between the first potential and the second potential is small, the power consumption can be saved.

Next, Example 2 will be described. As indicated in FIG. 12, in Example 2, the first common potentials Com1 of 0V and 3V are alternately applied to the first common electrode CE1, and the second common potential Com2 of 3V and 0V are alternately applied to the second common electrode CE2. Moreover, in a frame, the potential Px1 of a video signal is applied in a range of 0 to 5V to the first pixel electrode PE1, and the potential Px2 of a video signal is applied in a range of 3 to −2V to the second pixel electrode PE2. The range of the potential Px1 and the range of the potential Px2 interchange, for example, one frame to the next. FIG. 16 shows an example of variation in potential of each electrode with time in Example 2.

FIG. 16, in its part (a), shows the potentials of the first common electrode CE1 and the first pixel electrode PE1, and part (b) shows the potentials of the second common electrode CE2 and the second pixel electrode PE2. In the example of FIG. 16, the first common potential Com1 alternates between 0V and 3V from one frame to the next. The second common potential Com2 is at antiphase to the first common potential Com1 and alternates between 3V and 0V. 0V is an example of the first potential. 3V is an example of the third potential, which is higher than the first potential. 5V is an example of the second potential, which is higher than the third potential. −2V is an example of the fourth potential, which is lower than the first potential.

In a frame where the first common potential Com1 is at 0V and the second common potential Com2 is at 3V, the potential Px1 of a video signal supplied to the first pixel electrode PE1 is in a range from 0V, which is equal to the first common potential Com1, to 5V. In the frame, the potential Px2 of the video signal supplied to the second pixel electrode PE2 is in a range from 3V, which is equal to the second common potential Com2, to −2V. According to Example 2, an advantage similar to that of Example 1 can be obtained although its effect is less than that of Example 1, that is, here, the potentials of adjacent common electrodes are different from each other, the equipotential lines extending linearly along the second direction Y and arranged along the first direction X are close to each other in the vicinity of the connection portion 30. Thus, the rotational directions of the liquid crystal molecules LM can be stabilized more easily than in the comparative example.

As described above, in the liquid crystal display device DSP of this embodiment, the common electrodes CE are each divided into the first and second common electrodes CE1 and CE2 to be arranged alternately along the first direction X, and therefore different potentials can be supplied to adjacent first and second common electrodes CE1 and CE2, respectively. Thus, the alignment of the liquid crystal molecules LM in the vicinity of the boundary between adjacent subpixels SPX can be stabilized, thereby improving the display quality of the liquid crystal display device DSP. In addition to the above, various other favorable effects can be obtained from the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Note that the structures disclosed in the above-described embodiments can be combined in any way as needed.

What is claimed is:
1. A liquid crystal display device, comprising:
a first substrate;
a second substrate opposing the first substrate; and
a liquid crystal layer disposed between the first substrate and the second substrate, wherein
the first substrate comprises a plurality of scanning signal lines extending in a first direction, a plurality of video signal lines extending in a second direction intersecting the first direction, a plurality of pixel electrodes electrically connected to the video signal lines, respectively, and a plurality of common electrodes,
the common electrodes include a plurality of first common electrodes and a plurality of second common electrodes separated from the plurality of first common electrodes, which are alternately arranged along the first direction,
the pixel electrodes include a plurality of first pixel electrodes and a plurality of second pixel electrodes that are alternately arranged along the first direction, and each of the first pixel electrodes and each of the second pixel electrodes includes a plurality of linear electrodes extending along the first direction and a connection portion connecting ends of the linear electrodes respectively to each other and extending along the second direction, the linear electrodes of one of the first pixel electrodes overlap one of the first common electrodes in a plan view, and the connection portion of the one of the first pixel electrodes overlaps a first slit between the one of the first common electrode and one of the second common electrodes in the plan view, the linear electrodes of one of the second pixel electrodes overlap one of the second common electrodes in the plan view, and the connection portion of the one of the second pixel electrodes overlaps a second slit between the one of the second common electrodes and one of the first common electrodes in the plan view, the first slit and the second slit extend along the second direction and do not overlap each of the video signal lines, and a first common potential applied to the first common electrodes is different from a second common potential applied to the second common electrodes.

2. The liquid crystal display device of claim 1, wherein the first common potential alternates between a first potential and a second potential higher than the first potential from one frame to a next, the second common potential is at antiphase to the first common potential and alternates between the second potential and the first potential, in a frame where the first common potential is the first potential and the second common potential is the second potential, a potential of a video signal supplied from the video signal lines to the first pixel electrodes is in a range from the first potential to the second potential, and a potential of a video signal supplied from the video signal lines to the second pixel electrodes is in a range from the second potential to the first potential.

3. The liquid crystal display device of claim 1, wherein the first common potential alternates between a first potential and a third potential higher than the first potential from one frame to a next, the second common potential is at antiphase to the first common potential and alternates between the third potential and the first potential, in a frame where the first common potential is the first potential and the second common potential is the third potential, a potential of a video signal supplied from the video signal lines to the first pixel electrodes is in a range from the first potential to a second potential higher than the third potential, and a potential of a video signal supplied from the video signal lines to the second pixel electrodes is in a range from the third potential to a fourth potential lower than the first potential.

4. The liquid crystal display device of claim 1, wherein the first common electrodes respectively overlap even-numbered ones of the video signal lines without overlapping odd-numbered ones of the video signal lines, whereas the second common electrodes respectively overlap odd-numbered ones of the video signal lines without overlapping even-numbered ones of the video signal lines.

5. The liquid crystal display device of claim 1, wherein in the first direction, the connection portion has a width greater than that of the first slit or the second slit, and overlaps one of the first common electrodes and one of the second common electrodes.

6. The liquid crystal display device of claim 1, wherein the first common electrodes overlap the linear electrodes of the first pixel electrodes arranged along the second direction intersecting the first direction, and the second common electrodes overlap the linear electrodes of the second pixel electrodes arranged along the second direction.

7. The liquid crystal display device of claim 1, wherein the second substrate further comprises a light-shielding layer overlapping the scanning signal lines and the video signal lines, and the light-shielding layer overlaps at least part of the connection portions.

8. The liquid crystal display device of claim 7, wherein the light-shielding layer overlaps distal ends of the linear electrodes.

9. The liquid crystal display device of claim 1, wherein in a thickness direction of the first substrate, the pixel electrodes are located between the common electrodes and the liquid crystal layer.

10. The liquid crystal display device of claim 1, wherein the first substrate further comprises a first alignment film in contact with the liquid crystal layer, the second substrate further comprises a second alignment film in contact with the liquid crystal layer, the first alignment film and the second alignment film have a function of aligning liquid crystal molecules contained in the liquid crystal layer along an initial alignment direction, and the initial alignment direction coincides with the first direction.

11. The liquid crystal display device of claim 10, wherein the liquid crystal molecules have a positive dielectric anisotropy.

12. The liquid crystal display device of claim 1, wherein the linear electrodes each have a shape tapered off towards a distal end.

13. The liquid crystal display device of claim 1, wherein the linear electrodes each include a first side and a second side arranged along a second direction intersecting the first direction, and a top side which connects the first side and the second side to each other.

14. The liquid crystal display device of claim 13, wherein the first side and the second side are inclined with respect to the first direction.

15. The liquid crystal display device of claim 13, wherein in a vicinity of the first side, liquid crystal molecules contained in the liquid crystal layer rotate in a first rotational direction according to voltage applied between one of the pixel electrodes and one of the common electrodes, and in a vicinity of the second side, liquid crystal molecules contained in the liquid crystal layer rotate in a second rotational direction different from the first rotational direction according to voltage applied between one of the pixel electrodes and one of the common electrodes.

16. The liquid crystal display device of claim 15, wherein an area where liquid crystal molecules contained in the liquid crystal layer do not rotate even when voltage is applied between one of the pixel electrodes and one of the common electrodes, is generated between the first side and the second side of the one of the pixel electrodes.

* * * * *